(12) United States Patent
Syllaios et al.

(10) Patent No.: US 11,764,817 B2
(45) Date of Patent: Sep. 19, 2023

(54) SPECTRUM-ANALYSIS-ISOLATION-SYNTHESIS MACHINE LEARNING-BASED RECEIVER SYSTEM AND METHOD FOR SPECTRUM COEXISTENCE AND SHARING APPLICATIONS

(71) Applicant: Booz Allen Hamilton Inc., McLean, VA (US)

(72) Inventors: Ioannis Syllaios, Arlington, VA (US); Alex Saunders, El Segundo, CA (US); Katherine Olsen, Arlington, VA (US); Michael Calabro, Alexandria, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 95 days.

(21) Appl. No.: 17/493,622

(22) Filed: Oct. 4, 2021

(65) Prior Publication Data
US 2023/0109658 A1 Apr. 6, 2023

(51) Int. Cl.
*H04B 1/18* (2006.01)
*H04B 1/71* (2011.01)
*G06F 18/23* (2023.01)

(52) U.S. Cl.
CPC .............. *H04B 1/18* (2013.01); *G06F 18/23* (2023.01); *H04B 1/7101* (2013.01)

(58) Field of Classification Search
CPC .......... H04B 1/18; H04B 1/7101; G06F 18/23
See application file for complete search history.

(56) References Cited

U.S. PATENT DOCUMENTS

| | | | |
|---|---|---|---|
| 2016/0127931 A1* | 5/2016 | Baxley | G06T 7/60 455/67.16 |
| 2019/0349390 A1* | 11/2019 | Kito | H04L 47/28 |
| 2021/0327308 A1* | 10/2021 | Payton | H04K 3/45 |
| 2022/0116130 A1* | 4/2022 | Elmaghbub | G06N 3/045 |

* cited by examiner

*Primary Examiner* — Nguyen T Vo
(74) *Attorney, Agent, or Firm* — BUCHANAN INGERSOLL & ROONEY PC (57) ABSTRACT

Exemplary embodiments of the present disclosure are directed to a machine learning-based receiver that operates on the basis of a wide-band RF front-end. The RF front-end outputs clean IQ data to a SPectrum-Analysis-Isolation-Synthesis (SPAIS) system in order to collect analytics of signals present within the monitored band of frequencies, including signal center frequencies, bandwidth and power. The SPAIS system pre-processes the captured wideband IQ data in order to locate frequency bands with signal energy, isolate and synthesize the located frequency bands in corresponding IQ data for individual processing by a neural network with high classification accuracy.

15 Claims, 12 Drawing Sheets

SPECTRUM-ANALYSIS-ISOLATION-SYNTHESIS MACHINE LEARNING-BASED RECEIVER SYSTEM AND METHOD FOR SPECTRUM COEXISTENCE AND SHARING APPLICATIONS

FIELD

The present disclosure relates to signal processing system and method, and more particularly to signal identification and classification for spectrum coexistence and sharing applications including, without limitation, interference mitigation.

BACKGROUND

Figure 6:
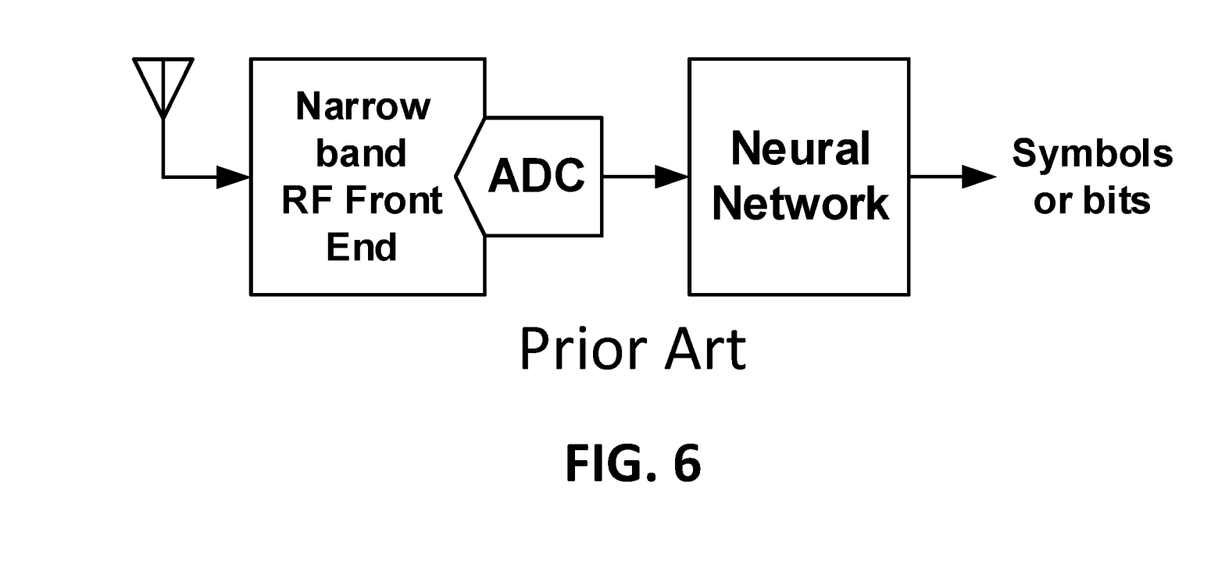
FIG. 6 illustrates a known machine learning (ML)-based receiver in accordance with a known implementation.

FIG. 6 illustrates an example of known machine learning neural network-based (ML-based) receivers, which are designed for operation with a narrow-band RF front-end. These ML-based receivers reject out of band interference and noise which may negatively impact the classification accuracy and detection performance of the neural network. Extending the capability of these ML-based receivers to detect and classify multiple radio frequency signals which coexist in a wideband spectrum of frequencies relies heavily on effective and extremely time-consuming training of machine learning neural networks. The training should account for all possible combinations of the coexisting radio frequency signals. It is extremely difficult and highly improbable that known ML-based receivers will have a neural network (NN) that meets the extensive training requirement. As a result, these receivers are unable to detect and classify individual signals or combinations of signals with high accuracy outside of a laboratory environment.

SUMMARY

An exemplary signal processing method is disclosed, the method comprising: receiving, by an RF receiver, a continuous spectrum of RF signals; digitizing, by a signal processor, the RF signals as in-phase (I) and quadrature (Q) data; estimating, by the signal processor, a spectrum of the IQ data; identifying, by the signal processor, one or more data signals in the IQ data; estimating, by the signal processor, at least a center frequency and a bandwidth of each data signal; reconstructing, by the signal processor, each of the one or more data signals based on at least the data signal's estimated center frequency and bandwidth; classifying, by a neural network of the signal processor, the one or more reconstructed data signals; and generating, by the signal processor, an output signal which includes a classification result of each of the one or more reconstructed data signals.

An exemplary signal processing system is disclosed, the system comprising: a receiver configured to receive a continuous spectrum of RF signals; at least one processor configured to: digitize the continuous spectrum of RF signals as in-phase (I) and quadrature (IQ) data; estimate a spectrum of the IQ data; identify one or more data signals in the IQ data; estimate at least a center frequency and a bandwidth of each data signal; reconstruct each of the one or more data signals based on the data signal's estimated center frequency and bandwidth; classify the one or more reconstructed data signals; and generate an output signal which includes a classification result of each of the one or more reconstructed data signals.

A non-transitory computer readable medium is disclosed, the computer readable medium storing program code for performing RF signal processing, the program code causing a signal processor to perform operations comprising: receiving, by an RF receiver, a continuous spectrum of RF signals; digitizing, by a signal processor, the continuous spectrum of RF signals as in-phase (I) and quadrature (IQ) data; estimating, by the signal processor, a spectrum of the IQ data; identifying, by the signal processor, one or more data signals in the IQ data; estimating, by the signal processor, at least a center frequency and a bandwidth of each data signal; reconstructing, by the signal processor, each of the one or more data signals based on at least the data signal's estimated center frequency and bandwidth; classifying, by a neural network of the signal processor, the one or more reconstructed data signals; and generating, by the signal processor, a data signal which includes a classification result of each of the one or more reconstructed data signals.

BRIEF DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and, therefore, is not intended to necessarily limit the scope of the disclosure.

DETAILED DESCRIPTION

Exemplary embodiments of the present disclosure are directed to an ML-based radio frequency (RF) receiver system with spectrum monitoring and slicing capability for use with spectrum coexistence and sharing applications including, without limitation, interference mitigation. The novel ML-based RF receiver system of the present disclosure allows for multi-band centered and concurrently received RF signals to be detected and classified by a neural network (NN) on a per signal or spectrum slice basis. A spectrum continuum is digitized to in-phase (I) and quadrature (Q) data by an analog-to-digital (ADC) converter of the receiver front-end. The IQ data are initially processed by a SPectrum-Analysis-Isolation-Synthesis (SPAIS) system in order to collect analytics of signals present within the monitored band of frequencies, where the collected analytics include signal center frequencies, bandwidth, and power. The signals which are determined to be present in the band of frequencies are isolated to allow for more efficient sequential processing by a NN. The exemplary ML based RF receiver system disclosed herein, provides for efficient ML-based spectrum coexistence and sharing (SCS) applications.

Figure 1:
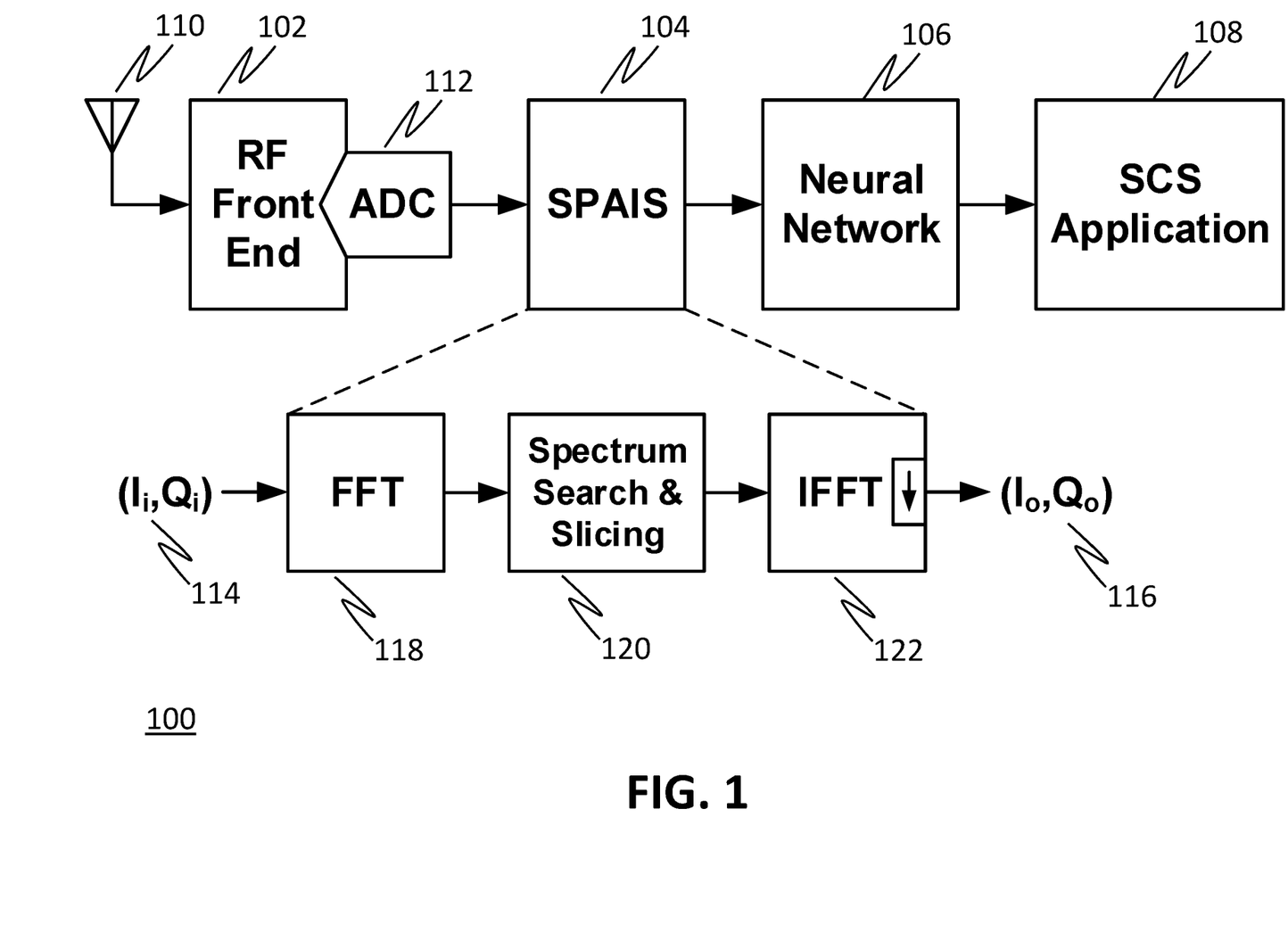
FIG. 1 illustrates a system overview in accordance with an exemplary embodiment of the present disclosure.

FIG. 1 illustrates an ML-based RF receiver system overview in accordance with an exemplary embodiment of the present disclosure.

Figure 2A:
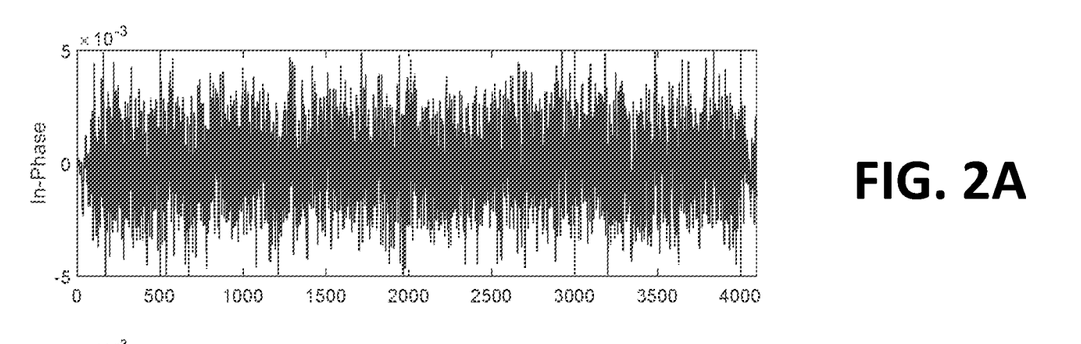
FIGS. 2A and 2B illustrate segments of I and Q data points output by the RF Front End in accordance with an exemplary embodiment of the present disclosure.
Figure 2B:
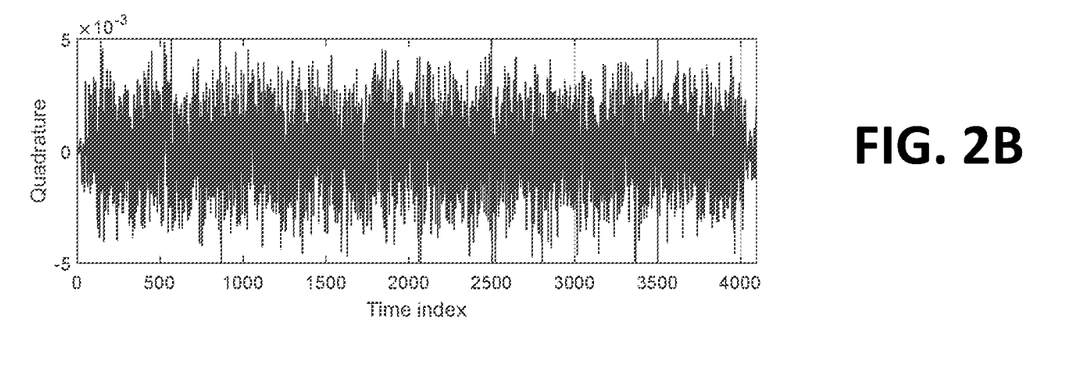

As shown in FIG. 1, the ML-based RF receiver system 100 can include an RF Front End 102, a SPAIS system 104, a NN 106, and a SCS application 108. The RF Front End 102 is a receiver configured to receive a continuous spectrum of RF signals. The continuous spectrum of RF signals can include multi-band centered and concurrently received RF signals. According to an exemplary embodiment, the RF Front End 102 can include one or more components which initially receive and process an input or incoming RF signal from a source. The RF Front End 102 can include components and circuitry to convert the received RF signal to an intermediate frequency. The one or more components include an antenna 110 and a digital signal processor configured to include any combination of bandpass filter, an RF amplifier, a local oscillator, a mixer, and an analog-to-digital converter (ADC) 112. The RF Front End 102 digitizes the received RF signal and generates in-phase (I) and quadrature (Q) data 114. FIGS. 2A and 2B illustrate segments of I and Q data points output by the RF Front End in accordance with an exemplary embodiment of the present disclosure. The I and Q data of FIGS. 2A and 2B is comprised of 4096 data points.

The IQ data 114 output from the RF Front End 102 can be input to the SPAIS system 104. The SPAIS system 104 can be performed by one or more processors configured to execute program code for performing the specified operations. According to exemplary embodiments of the present disclosure, the SPAIS system 104 is configured to collect analytics of signals present within the monitored band of frequencies, including signal center frequencies, bandwidth and power and subsequently isolate those for efficient sequential processing by a NN. As shown in FIG. 1, the SPAIS system 104 is configured to execute a Fast-Fourier Transform (FFT) algorithm 118 which pre-processes the captured wideband IQ data 114 by performing spectrum analysis to estimate a spectrum of the IQ data 114. According to an exemplary embodiment, an N-point FFT is performed on the IQ data 114.

FIGS. 3A to 3H illustrate aspects of the SPAIS system 106 in accordance with an exemplary embodiment of the present disclosure.

Figures 3A, 3B:
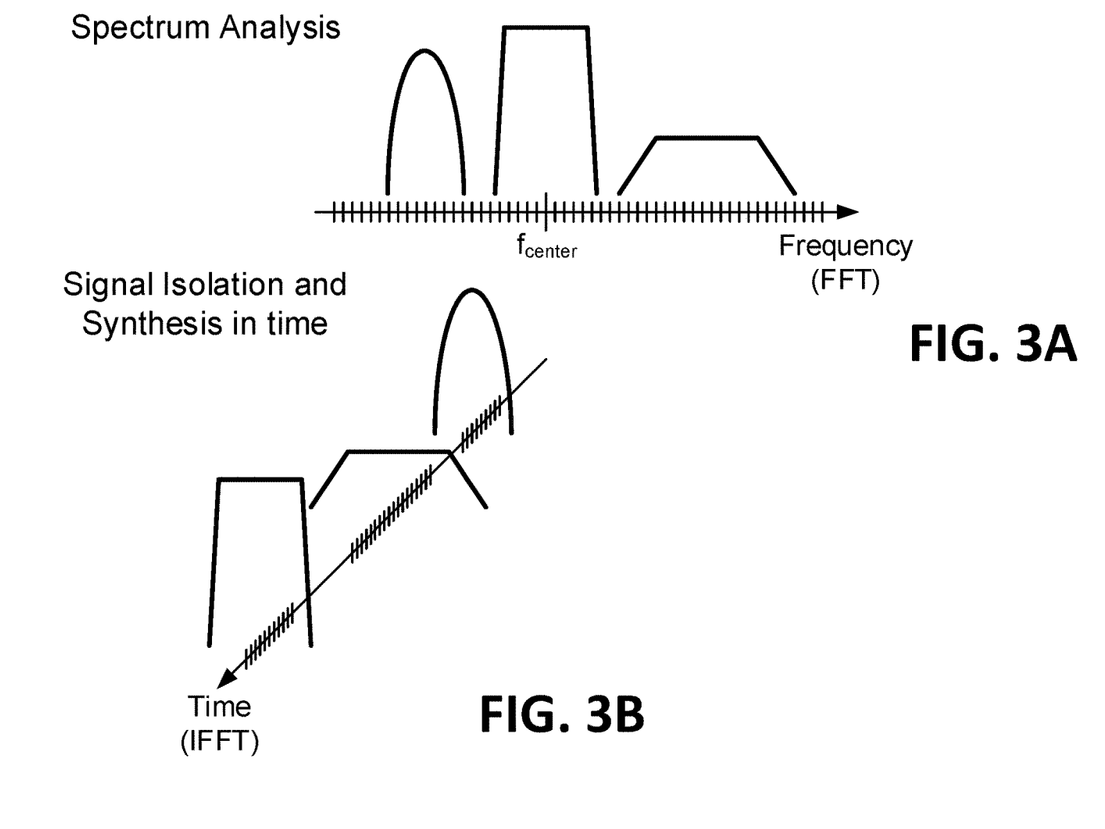
FIGS. 3A to 3H illustrate aspects of the SPAIS system 106 in accordance with an exemplary embodiment of the present disclosure.

As shown in FIG. 3A, the SPAIS system 106 is composed of a Fast-Fourier Transform (FFT) 118 module that performs a spectrum analysis on the received IQ data. FIG. 3B illustrates the results of a spectrum search and slicing module 120 which identifies signals present and their spectral location within the monitored band of frequencies and an Inverse-FFT (IFFT) module 122 that translates and synthesizes the identified signals with reduced data rate according to their bandwidth or spectrum slice. The SPAIS system 106 facilitates efficient training of a NN to detect and classify individual signals or signal combinations of interest with high accuracy and undisturbed by other coexisting signals.

Figure 3C:
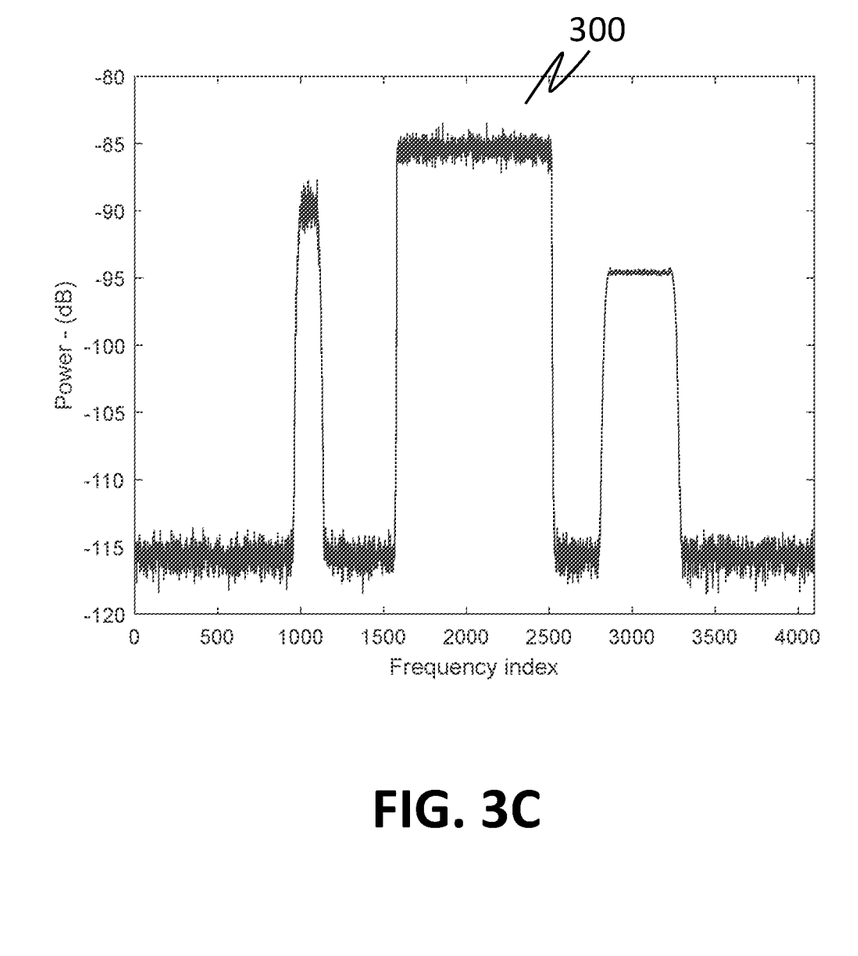

FIG. 3C illustrates an exemplary waveform 300 of an N-point FFT performed by the SPAIS system 106 on IQ data 114 output from the RF Front End 104 in accordance with an exemplary embodiment of the present disclosure. The N-point FFT X(k) of a time-domain signal x(n) is described by the following equation:

$$X(k) = \sum_{n=0}^{N-1} x(n) e^{-j\frac{2\pi}{N}kn}$$

where, n is time index in [0, N−1] and k is frequency index in [0, N−1]. The power spectrum shown in FIG. 3C corresponds to a 4096-point FFT performed on the captured ($I_i$, $Q_i$) data 114.

According to exemplary embodiments, an FFT module 118 is used for the efficient computation of the Discrete Fourier Transform (DFT) of the time-domain IQ data to the frequency-domain (see FIG. 3A). It should be understood that the FFT module 118 could be replaced with another suitable transform where the basis functions are other than harmonically related complex exponential functions.

Figure 3D:
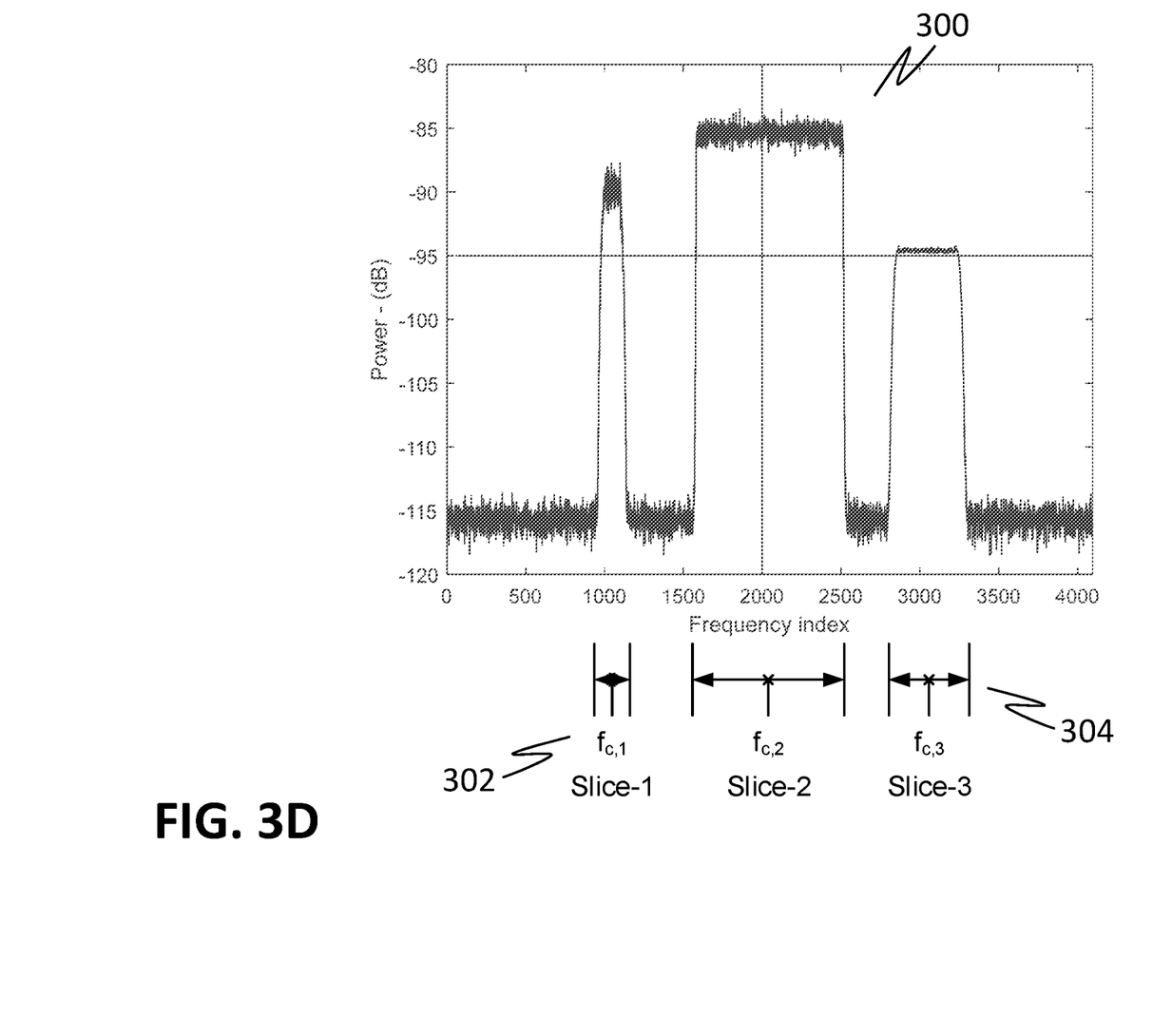

FIG. 3D illustrates a spectrum search and spectrum slicing performed on the signal of FIG. 3B. As shown in FIG. 3D, the SPAIS system 106 searches the estimated spectrum for signals present and estimates their center frequency $f_{c,i}$, (i=1, 2, 3 . . . ) 302, bandwidth, power and other analytics via processing of the FFT coefficients X(k). The spectrum slicing regions 304 are determined according to reported signal analytics or other spectrum monitoring requirements. For example, the SPAIS system 104 identifies the signals 302 present and their spectral location 304 within the monitored band of frequencies such that the IQ data is isolated and synthesized within the corresponding frequency bands. The spectrum search and slicing module 120 also estimates a center frequency and bandwidth of each data signal based on the isolated and synthesized IQ data.

Figure 3E:
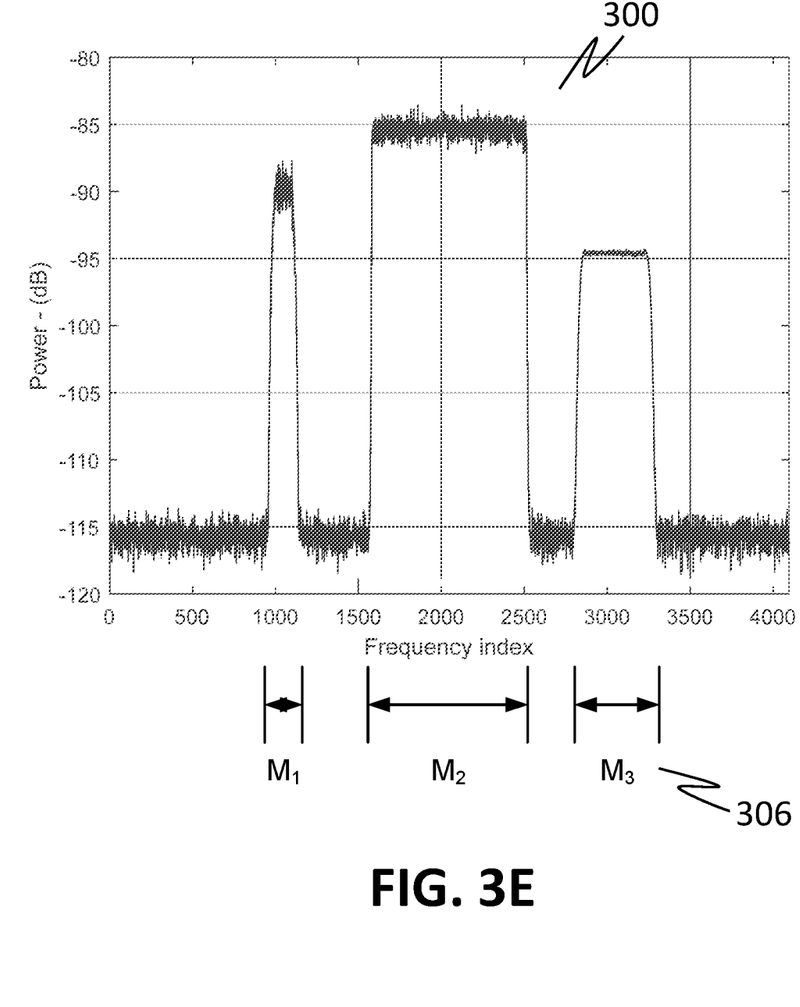

Once the data signals are identified, an Inverse-FFT (IFFT) algorithm 122 is performed such that each of the one or more data signals is then reconstructed based on the data signal's estimated center frequency and spectrum slice allocation. FIG. 3E illustrates exemplary results of a signal isolation and synthesis performed by the IFFT on the signal 300 of FIG. 3C. As shown in FIG. 3E, the SPAIS system 106 uses the IFFT module 122 to perform M-point IFFT and synthesize in time-domain each signal 306 present in the band of frequencies and translate the existing signals to common center frequency by accounting for their respective center frequency and spectrum slice allocation. The IFFT module 122 translates and synthesizes the identified signals of the spectrum search and slicing module 120 with reduced data rate according to their bandwidth or spectrum slice. The M-point IFFT x(n) of a FFT X(k) is described by the following equation:

$$x(n) = \frac{1}{M}\sum_{k=0}^{M-1} X(k) e^{j\frac{2\pi}{N}kn}$$

where, n is time index in [0, M−1] and k is frequency index in [0, M−1].

The IFFT module 122 translates each signal that is present to a common center frequency by multiplying Equation 2 or x(n) by $e^{-j2\pi\Delta f_o n}$, where $\Delta f_o$ is the frequency offset between the signal center frequency and the common center frequency. The ratio $N/M_i$, (i=1, 2, 3 . . . ) reflects the captured IQ data volume reduction the SPAIS system 104 performs for the synthesis of the IQ data of the i-th signal found.

Figure 3F:
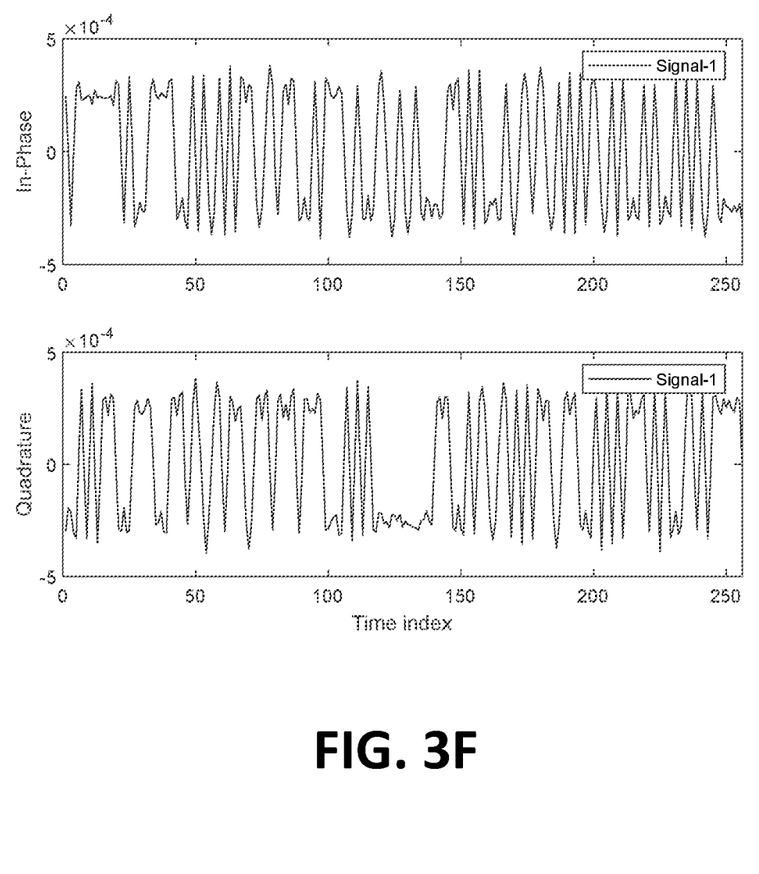

FIG. 3F illustrates an exemplary SPAIS system output for a first signal found in the I and Q waveforms of FIGS. 2A and 2B, respectively. For the signal of FIG. 3E, the SPAIS system 104 performs an IFFT in which $M_1$=256-point. The processing of the Input $(T_i, Q_i)$ data volume, or equivalently, results in a signal data-rate reduction by a factor of $N/M_1=4096/256=16$.

Figure 3G:
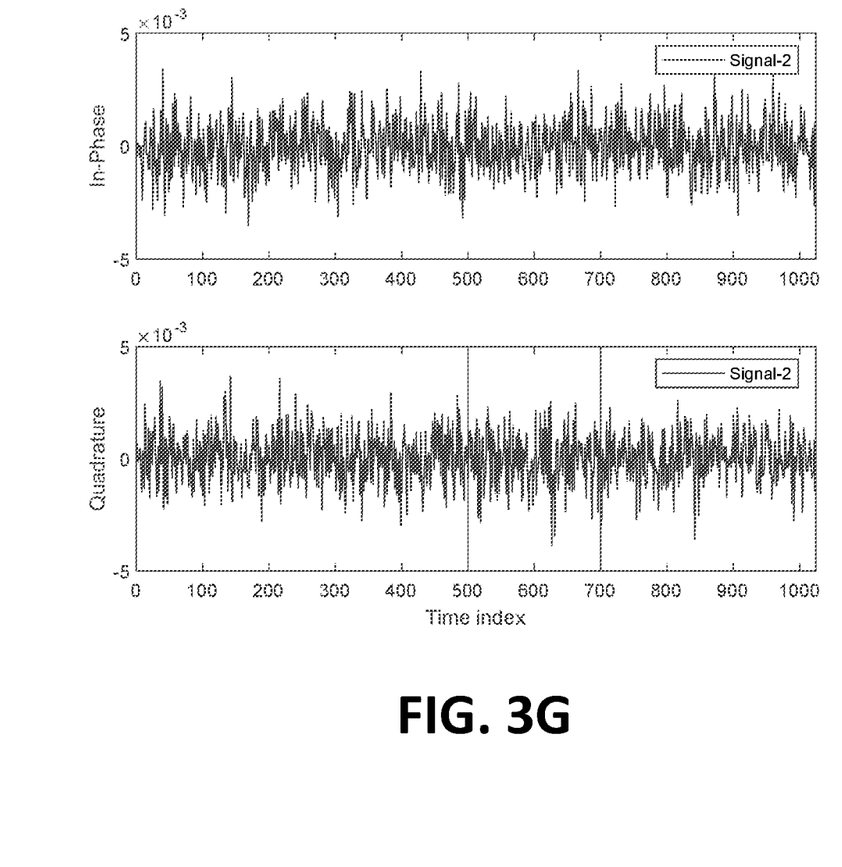

FIG. 3G illustrates an exemplary SPAIS system output for a second signal found in the I and Q waveforms of FIGS. 2A and 2B, respectively. For the signal of FIG. 3G, the SPAIS system 104 performs an IFFT in which $M_2=256$-point. The processing of the Input $(T_i, Q_i)$ data volume, or equivalently, results in a signal data-rate reduction by a factor of $N/M_2=4096/1024=4$.

Figure 3H:
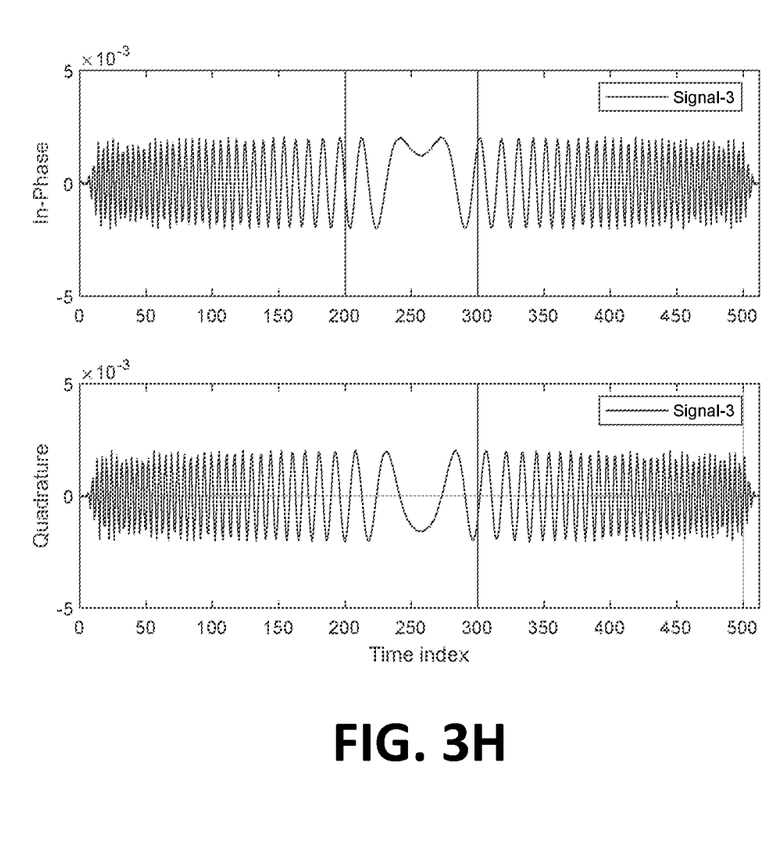

FIG. 3H illustrates an exemplary SPAIS system output for a third signal found in the I and Q waveforms of FIGS. 2A and 2B, respectively. For the signal of FIG. 3H, the SPAIS system 104 performs an IFFT in which $M_3=512$-point. The processing of the Input $(T_i, Q_i)$ data volume, or equivalently, results in a signal data-rate reduction by a factor of $N/M_3=4096/512=8$.

Returning to FIG. 1, the NN 106 receives the reconstructed IQ data 116 from the SPAIS system 104 and performs a data classification on the one or more reconstructed data signals. The NN 106 leverages the spectrum search and spectrum slicing capability of the SPAIS 104 system and it is trained to classify individual signals or the coexistence of those in close proximity within a spectrum of frequencies. As a result, the NN 106 provides very high classification accuracy on a per signal classification basis and undisturbed by other coexisting signals within the broader monitored band of frequencies. The NN 106 generates an output signal which includes a classification result of each of the one or more reconstructed data signals. The output signal generated by the NN 106 is sent to a Spectrum Coexistence and Sharing (SCS) application 108, which optimizes use of the radio frequency or wireless communication channels based on the classification of the NN 106.

Figure 4:
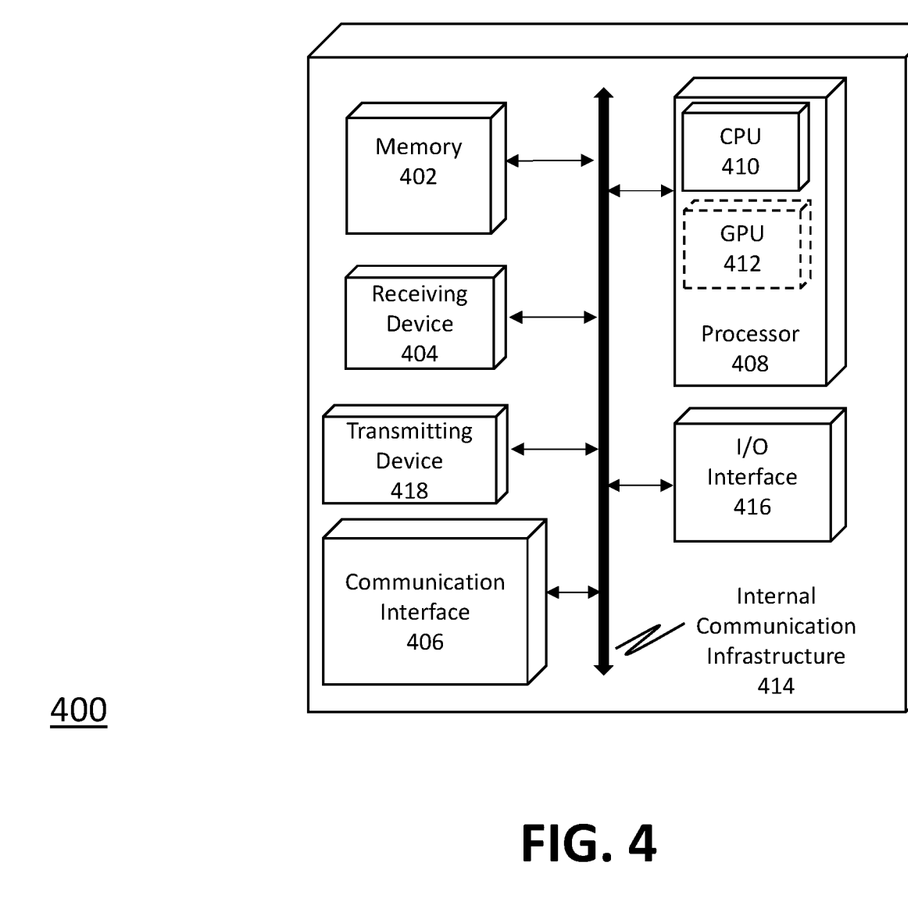
FIG. 4 illustrates a hardware configuration of a processing device in accordance with an exemplary embodiment of the present disclosure.

FIG. 4 illustrates a hardware configuration of a processing device according to an exemplary embodiment of the present disclosure.

The ML-based RF receiver system 100 can include one or more processing device substantially comprising the hardware and/or software components described herein. As shown in FIG. 4, ML-based RF receiver system 100 includes memory 402, a receiving device 404, a communication interface 406, one or more processors 408, an internal communication infrastructure 414, an input/output (I/O) interface 416, and a transmitting device 418.

The memory 402 can be configured for storing program code for performing at least one of the signal processing operations of the RF Front End 102, the SPAIS system 104, and the NN 106. The memory 402 can include one or more memory devices such as volatile or non-volatile memory. For example, the volatile memory can include random access memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). The non-volatile memory can include an external memory device, such as cloud storage, connected to communicate with the system 100 via a network. According to an exemplary embodiment, an external memory device can be used in place of any resident memory devices. Data stored in system 100 may be stored on any type of suitable computer readable media, such as optical storage (e.g., a compact disc, digital versatile disc, Blu-ray disc, etc.) or magnetic tape storage (e.g., a hard disk drive). The stored data can include image data, control data, and/or system data generated and/or accessed by the processing device 408, and software or program code used by the processing device 408 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The receiving device 404 may be a combination of hardware and software components configured to receive at least the RF signals input to the RF Front End 102 and parameters for operations performed by the SPAIS system 104 and the NN 106. According to exemplary embodiments, the receiving device 404 can include a hardware component such as an antenna, a network interface (e.g., an Ethernet card), a communication port, a PCMCIA slot and card, or any other suitable component or device as desired. The receiving device 404 can be an input device for receiving signals and/or data packets encoded with image data from another device, such as a database, image sensor, image processor or other suitable device as desired. The receiving device 404 can be connected to other devices via a wired or wireless network or via a wired or wireless direct link or peer-to-peer connection without an intermediate device or access point. The hardware and software components of the receiving device 404 can be configured to receive RF signals from an RF source via the antenna 110. The RF signals can be communicated over a suitable communication medium which may include a local area network (LAN), the data network such as a wide area network (WAN) including second-, third-, or fifth generation (2G, 3G or 5G) cellular networks, a fourth-generation long-term evolution (4G LTE) cellular network, IEEE 802.15, universal mobile telecommunications service (UMTS), or other type of broadband communication network as desired. During a receive operation, the receiving device 404 can be configured to identify parts of the received data via a header and parse the data signal and/or data packet into small frames (e.g., bytes, words) or segments for further processing at the processor 408.

The processor 408 can be configured for executing the program code stored in memory 402. The processor 408 can be a special purpose or a general purpose processing device encoded with program code or software for performing the exemplary functions and/or features disclosed herein. According to exemplary embodiments of the present disclosure, the processing device can include a central processing unit (CPU) 410 and/or a graphics processing unit (GPU) 412. The processor 408 can be connected to the internal communication infrastructure 414 including a bus, message queue, or network, multi-core message-passing scheme, for communicating with other components of the system 100, such as the memory 402, input device 404, the communication interface 406, and the I/O interface 416. The processor 408 can include one or more processing devices such as a microprocessor, microcomputer, programmable logic unit or any other suitable hardware processing devices as desired. According to exemplary embodiments, the processor 408 can include a combination of hardware and software components, such as a special purpose hardware processing device being configured to execute or access program code or software for rendering images in a frame buffer for display. For example, when configured with a GPU 412, the processor 408 can include an arithmetic logic unit, on-chip memory, and be configured with an application program interface such as Vulkan®, OpenGL ES (Open Graphics Library for Embedded Systems), OpenVG (OpenVector Graphics), OpenCL (Open Computing Language), OpenGL (Open Graphics Library), Direct3D, CUDA® or any other suitable hardware and/or software platform as desired.

The I/O interface 416 can be configured to receive the signal from the processor 408 and generate an output suitable for a peripheral device via a direct wired or wireless link. The I/O interface 416 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The transmitting device 418 can be configured to receive data from the processor 408 and assemble the data into a data signal and/or data packets according to the specified communication protocol and data format of a peripheral device or remote device to which the data is to be sent. The transmitting device 418 can include any one or more of hardware and software components for generating and communicating the data signal over the internal communication infrastructure 414 and/or via a direct wired or wireless link to a peripheral or remote device. The transmitting device 418 can be configured to transmit information according to one or more communication protocols and data formats as discussed in connection with the receiving device 404.

The computer program code for performing the specialized functions described herein can be stored on a non-transitory computer usable medium, such as the memory devices for the system 100 (e.g., computing device), which may be memory semiconductors (e.g., DRAMs, etc.) or other tangible non-transitory means for providing software to the system 100. The computer programs (e.g., computer control logic) or software may be stored in a memory device 402 resident on/in the system 100 (e.g., a computing device). The computer programs may also be received via a communication interface 406. Such computer programs, when executed, may enable the system 100 to implement the present methods and exemplary embodiments discussed herein. Accordingly, such computer programs may represent controllers of the system 100. Where the present disclosure is implemented using software, the software may be stored in a computer program product or non-transitory computer readable medium and loaded into the system 100 using a removable storage drive, an interface, a hard disk drive, or the internal communication interface 406, where applicable.

The processor 408 can include one or more modules or engines configured to perform the functions of the exemplary embodiments described herein. Each of the modules or engines may be implemented using hardware and, in some instances, may also utilize software, such as corresponding to program code and/or programs stored in memory 402. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the system 100 to perform the functions disclosed herein. It will be apparent to persons having skill in the relevant art that such processes result in the system 100 being a specially configured computing device uniquely programmed to perform the functions of the exemplary embodiments described herein.

Figure 5:
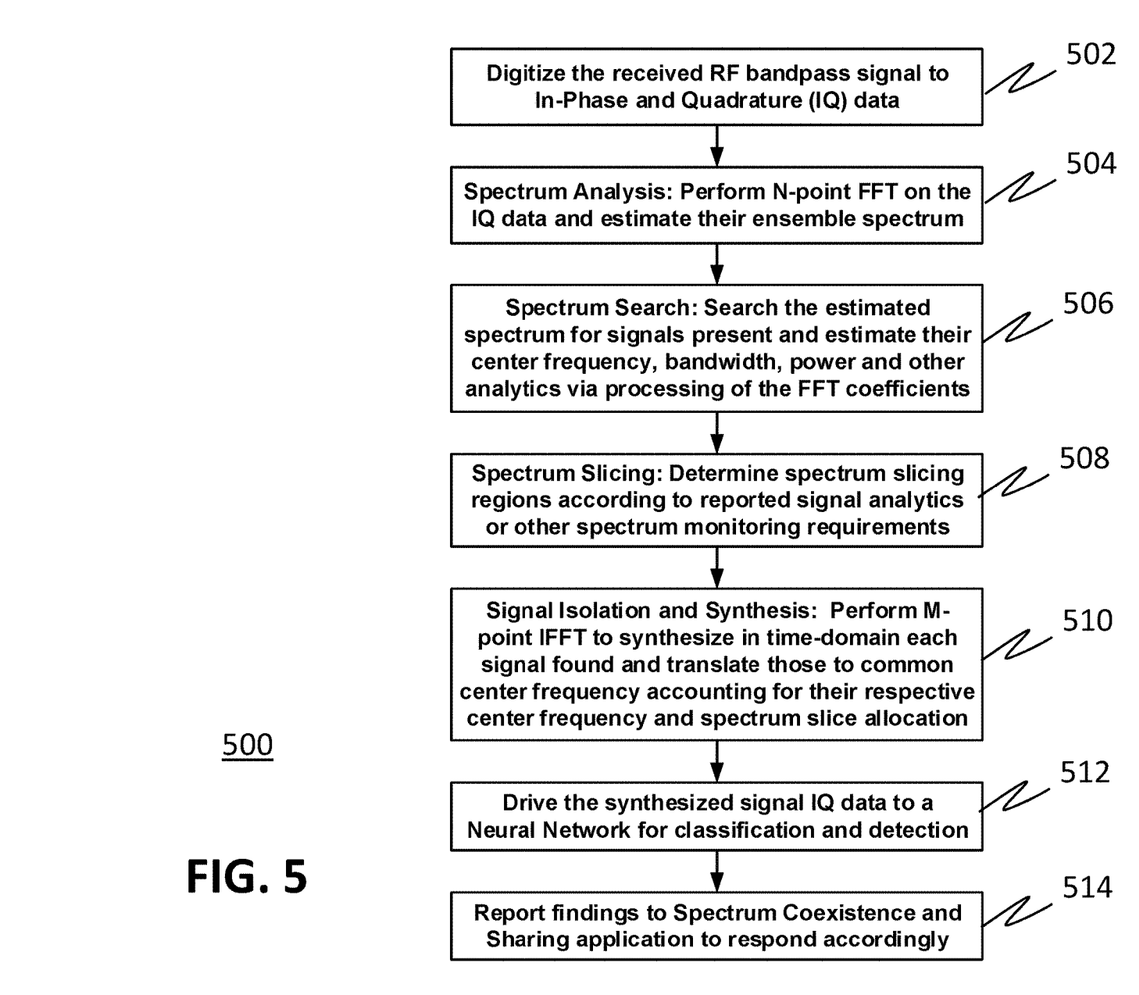
FIG. 5 illustrates a signal processing method 400 in accordance with an exemplary embodiment of the present disclosure.

FIG. 5 illustrates a signal processing method 400 in accordance with an exemplary embodiment of the present disclosure. The signal processing method 400 can be performed by one or more processing devices which execute or run software code having instructions corresponding to the operations and steps that follow.

In step 502, the RF Front End 102 receives a continuous spectrum of RF signals and digitizes the RF signals to in-phase (I) and quadrature (Q) data. In step 504, the processor 408 performs an N-point FFT on the IQ data and estimates their ensemble spectrum. The processor 408 identifies one or more one or more data signals in the IQ data by searching the estimated spectrum for signals present (Step 506). The processor 408 processes the FFT coefficients to estimate at least a center frequency and bandwidth of each data signal. According to an exemplary embodiment, the processor 408 can process the FFT coefficients to estimate power and other analytics of the signals present. In Step 508, the processor 408 determines spectrum slicing regions according to signal analytics and/or other spectrum monitoring requirements. Next, the processor 408 reconstructs each of the one or more data signals by performing an M-point IFFT to synthesize in time-domain each signal present and translate the signals present to a common center frequency by accounting for a respective center frequency and spectrum slice allocation (Step 510). The processor 408 sends the synthesized IQ data to a neural network for classification and detection (Step 512). In Step 514, the signal processor generates an output signal which includes a classification result of each of the one or more reconstructed data signals. According to an exemplary embodiment, the output signal can be provided to a Spectrum Coexistence and Sharing application which can generate a suitable response so that multiple categories of users to safely share the same frequency bands.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A signal processing method, comprising:
receiving, by an RF receiver, a continuous spectrum of RF signals;
digitizing, by a signal processor, the RF signals as in-phase (I) and quadrature (Q) data;
estimating, by the signal processor, a spectrum of the IQ data;
identifying, by the signal processor, one or more data signals in the IQ data;
estimating, by the signal processor, at least a center frequency and a bandwidth of each data signal;
reconstructing, by the signal processor, each of the one or more data signals based on at least the data signal's estimated center frequency and bandwidth;
classifying, by a neural network of the signal processor, the one or more reconstructed data signals; and
generating, by the signal processor, an output signal which includes a classification result of each of the one or more reconstructed data signals.

2. The method of claim 1, wherein estimating the spectrum of the IQ data comprises:
performing a time-to-frequency domain transform operation on the IQ data; and
analyzing a plurality of coefficients generated by the time-to-frequency domain operation to estimate a spectral density of the one or more data signals.

3. The method of claim 2, further comprising:
estimating a power of each data signal.

4. The method of claim 1, wherein reconstructing each of the one or more data signals comprises:
performing an inverse frequency-to-time domain transform operation.

5. The method of claim 4, wherein the inverse frequency-to-time-domain transform operation comprises reconstructing and synthesizing each of the one or more data signals at a lower data rate than a non-inverse time-to-frequency-domain transform operation.

6. The method of claim 1, comprising:
training the neural network to detect and classify RF signals using at least the one or more reconstructed data signals and associated signal analytics.

7. The method of claim 1, wherein receiving the continuous spectrum of received RF signals comprises:
processing the received RF signals using at least a bandpass filter.

8. A signal processing system, comprising:
a receiver configured to receive a continuous spectrum of RF signals;
at least one processor configured to:
digitize the continuous spectrum of RF signals as in-phase (I) and quadrature (IQ) data;
estimate a spectrum of the IQ data;
identify one or more data signals in the IQ data;
estimate at least a center frequency and a bandwidth of each data signal;
reconstruct each of the one or more data signals based on the data signal's estimated center frequency and bandwidth;
classify the one or more reconstructed data signals; and
generate an output signal which includes a classification result of each of the one or more reconstructed data signals.

9. The system of claim 8, wherein to estimate the spectrum of the IQ data, the at least one processor is configured to:
perform a time-to-frequency-domain transform operation on the IQ data; and
analyze a plurality of coefficients generated by the time-to-frequency-domain transform operation to estimate a spectral density of the one or more data signals.

10. The system of claim 9, wherein the at least one processor is further configured to:
estimate a power of each data signal.

11. The system of claim 8, wherein to reconstruct each of the one or more data signals, the at least one processor is configured to perform an inverse frequency-to-time-domain transform operation.

12. The system of claim 11, wherein by performing the inverse frequency-to-time-domain transform operation the at least one processor is configured to:
reconstruct and synthesize each of the one or more data signals at a lower data rate than a non-inverse time-to-frequency-domain transform operation.

13. The system of claim 8, wherein the at least one processor is further configured to:
train a neural network to detect and classify RF signals using at least the one or more reconstructed data signals.

14. The system of claim 8, wherein the receiver processes the received RF signals through at least a bandpass filter.

15. A non-transitory computer readable medium storing program code for performing RF signal processing, the program code causing a signal processor to perform operations comprising:
receiving, by an RF receiver, a continuous spectrum of RF signals;
digitizing, by a signal processor, the continuous spectrum of RF signals as in-phase (I) and quadrature (IQ) data;
estimating, by the signal processor, a spectrum of the IQ data;
identifying, by the signal processor, one or more data signals in the IQ data;
estimating, by the signal processor, at least a center frequency and a bandwidth of each data signal;
reconstructing, by the signal processor, each of the one or more data signals based on at least the data signal's estimated center frequency and bandwidth;
classifying, by a neural network of the signal processor, the one or more reconstructed data signals; and
generating, by the signal processor, a data signal which includes a classification result of each of the one or more reconstructed data signals.

* * * * *